United States Patent [19]

Anderson et al.

[11] 4,350,277
[45] Sep. 21, 1982

[54] PHOTOGRAPHIC PRINT PAPER GUIDE SPOOL

[75] Inventors: Richard D. Anderson, Maple Grove; John A. Wedel, Mendota Heights, both of Minn.

[73] Assignee: Pako Corporation, Minneapolis, Minn.

[21] Appl. No.: 187,830

[22] Filed: Sep. 16, 1980

[51] Int. Cl.³ .......................................... B65H 17/20
[52] U.S. Cl. ................................... 226/190; 242/71.9; 242/76
[58] Field of Search ...................... 226/190, 196, 191; 242/68, 76, 71.9, 118.5, 68.2; 279/2 R; 354/86, 339–341, 216

[56] References Cited

U.S. PATENT DOCUMENTS

| | | | |
|---|---|---|---|
| 3,252,163 | 5/1966 | Yedinak et al. | 226/191 X |
| 3,516,342 | 6/1970 | Luescher | 242/71.9 |
| 3,993,317 | 11/1976 | Flagg | 279/2 R |
| 4,158,429 | 6/1979 | Ohmori | 226/191 X |

*Primary Examiner*—Leonard D. Christian
*Attorney, Agent, or Firm*—Kinney, Lange, Braddock, Westman and Fairbairn

[57] ABSTRACT

In a photographic printer, photographic print paper is transported from the print paper supply to a print mask location. The print paper is guided by an interchangeable guide spool to ensure proper centering at the print mask location. The guide spool, being preset for a particular print paper width, automatically centers the print paper when mounted on a spindle so as to abut against a permanently positioned flange. The guide spool includes an inner sleeve that abuts against the permanently positioned flange, an outer sleeve coaxially rotating around the outer surface of the inner sleeve and having an outer surface that engages the photographic print paper, and guides attached proximate both ends of the outer sleeve for guiding the print paper on the outer surface of the outer sleeve.

11 Claims, 4 Drawing Figures

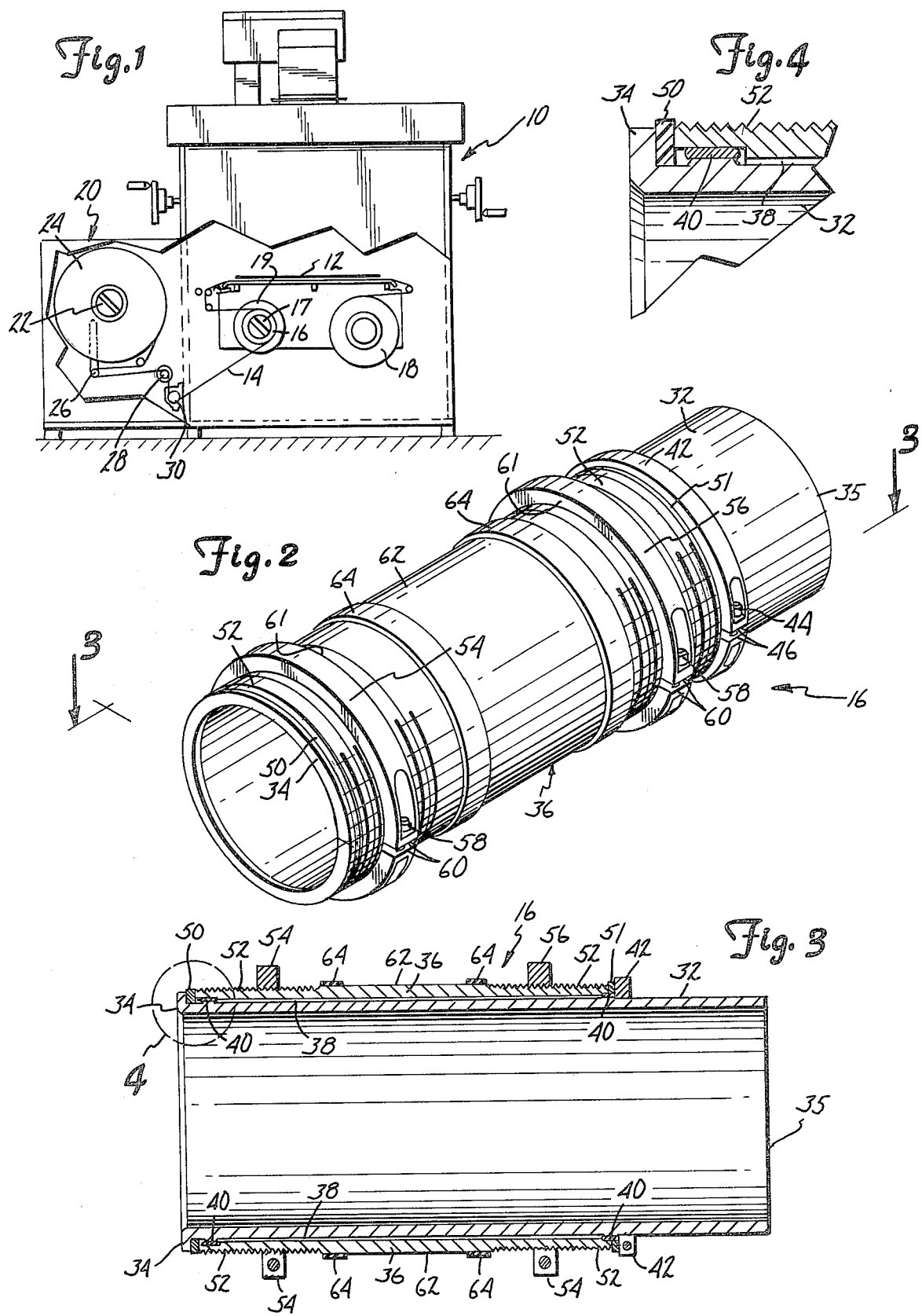

PHOTOGRAPHIC PRINT PAPER GUIDE SPOOL

BACKGROUND OF THE INVENTION

1. Field of the Invention

The present invention relates to guides used to guide photographic print paper in photographic printers. In particular, it relates to photographic print paper guides that are quickly attached and detached to accommodate and automatically center print paper of different widths.

2. Description of the Prior Art

Many photographic printers of the prior art have internal photographic print paper supplies, that is, the photographic print paper supply roll is located in the same cabinet that supports and houses the optical system, the paper deck, and the print paper mask. When different print paper widths are needed, the print paper supply roll with its spool is removed and another supply roll of a different width is placed in its stead. These supply rolls are, however, fairly small due to space restrictions in the cabinet. Thus, many of these photographic printers having internal print paper supply rolls are being converted to accommodate a large external print paper supply that enables the user to operate the photographic printer in a more efficient and economic manner.

For a proper conversion to an external print paper supply, the apparatus supporting and guiding the print paper roll on the outside of the cabinet must be perfectly aligned with the internal guiding system and paper mask of the photographic printer. If the external supply apparatus is not aligned with respect to the internal guiding system of the photographic printer and print paper mask, the print paper will not be centered properly under the print mask. In bordered photographic prints, the result is that one border is larger than the other, and in borderless prints, a border may appear on one edge of the photographic print. To avoid noticeable border problems, the photographic print paper must be held within plus or minus 0.015 inches of the print paper path that would result in perfect centering of the print paper in the paper mask. Thus, the conversion of an internal paper supply photographic printer to an external paper supply may easily result in off-centered photographic prints.

SUMMARY OF THE INVENTION

A photographic printer has a photographic print paper web that is transported from a print paper supply roll to a print paper mask location. An interchangeable guide spool guides the print paper, ensuring that the print paper is quickly and properly centered upon reaching the print mask location. The guide spool, being present for a particular print paper width, is quickly detached or attached to accommodate different print paper widths used in the photographic printer. The guide spool is automatically centered with respect to the print paper mask when positioned against a permanently positioned flange in the photographic printer. The guide spool includes an inner sleeve that attaches to a spindle and against the permanently positioned flange of the photographic printer, an outer sleeve coaxially rotating around the outer surface of the inner sleeve and having an outer surface engaging the photographic print paper, and guide means attached to the outer sleeve for guiding the print paper on the outer surface of the outer sleeve.

The guide spool allows the conversion of a photographic printer having an internal print paper supply to a photographic printer having a large external print paper supply without losing any of the guiding accuracy that the printer originally had. The photographic print paper travels from the external supply and is guided within the cabinet by the guide spool. The guide spool attaches to the spindle that previously held the internal print paper supply and against the permanently positioned flange. The guide spool, being automatically centered, in turn centers the photographic print paper within the proper tolerances for development of the image within the proper borders at the print mask location. When an external supply roll of a different width is desired, a new guide spool being specifically preset to accommodate that particular print paper width is attached to the spindle in place of the previous guide spool.

BRIEF DESCRIPTION OF THE DRAWINGS

FIG. 1 is a front view (with certain sections removed for better clarity) of a photographic printer having had an internal print paper supply converted to an external print paper supply.

FIG. 2 is a perspective view of the paper guide spool of the present invention.

FIG. 3 is a cross-sectional view taken along line 3—3 of FIG. 2.

FIG. 4 is an enlarged fragmentary cross-sectional view of a portion of the guide spool found within broken line circle 4 in FIG. 3.

DETAILED DESCRIPTION OF THE PREFERRED EMBODIMENTS

FIG. 1 shows a photographic printer 10 having a print mask location 12 to which print paper 14 is guided by guide spool 16 and wound on takeup roll 18. Guide spool 16 is attached to spindle 17 which previously held an internal print paper supply (not shown). Spindle 27 is preferably an expandable rubber core chuck. Print paper 14 is supplied by external supply apparatus 20. The external supply apparatus 20 has been added to the photographic printer 10, converting the printer 10 from an internal print paper supply to an external print paper supply. A permanently positioned flange 19 adjacent to one end of the spindle 17 provides a registration point against which guide spool 16 is placed. The permanently positioned flange 19 is in a fixed spatial relationship with the print mask location 12 and the optical centerline of printer 10.

External print paper supply apparatus 20 preferably has an expandable spindle 22 on which large print paper supply roll 24 rotates. Photographic print paper 14 leaves print paper supply roll 24, engages bale arm 26 and idler roll 28 with paper guide, travels through light lock 30, and enters photographic printer 10. Typically, the externally supplied print paper roll 24 has approximately 1,150 feet of print paper per roll, while an internally located supply roll would typically have approximately 275 feet of photographic print paper. The external print paper supply allows longer periods between roll changes, thus increasing the efficiency of the printer.

The guide spool 16 is best seen in FIGS. 2 and 3. Guide spool 16 has an inner sleeve 32 that has a flange 34 at one end. Opposite end 35 of inner sleeve 32 engages permanent flange 19 to positively align sleeve 32 with respect to the optical centerline of printer 10. An outer sleeve 36 coaxially surrounds outer surface 38 of inner sleeve 32. Outer sleeve 36 rotates around the inner sleeve on bearings 40. Bearings 40 are preferably a layered Teflon bronze radial type bearing.

Outer sleeve 36 is held in position around inner sleeve 32 by flange 34 on one end and outer sleeve retainer ring 42 on the other end. Outer sleeve retainer ring 42 is preferably of the configuration shown in FIGS. 2 and 3, being a split ring tightened around the inner sleeve 32 by screw 44 engaging and bringing together ends 46. Nylon washer 50, as best seen in FIG. 4, is positioned between flange 34 and outer sleeve 36. Nylon washer 51, as best seen in FIG. 4, is positioned between outer sleeve retainer ring 42 and outer sleeve 36. Nylon washers 50 and 51 provide a buffer from flange 34 and retainer ring 42 and aid in the rotational movement of outer sleeve 36.

Outer sleeve 36 has threads 52 on which guide flanges 54, 56 are attached to outer sleeve 36. Guide flanges 54, 56 are preferably of a similar split ring configuration as outer sleeve retainer ring 42. Guide flanges 54,56 are tightened around outer sleeve 36 by screw 58 engaging and bringing together ends 60. Tightening screw 58 sets the guide flanges 54,56 in a fixed position on the outer sleeve 36 for a particular paper width. The fixed position of guide flanges 54,56 also sets the guide path for the print paper since the distance from the flanges 54,56 to the permanent flange 19 of the printer 10 is set.

Guide flanges 54,56 guide the photographic print paper between opposite facing side edges 61. Guide flanges 54,56 are preferably set at a distance from each other to correspond to a particular width of photographic print paper. However, guide flanges 54,56 are secured to outer sleeve 36 by threaded engagement with threads 52, and when screws 58 are loosened, guide flanges 54,56 can be moved in either axial direction, either increasing or decreasing the distance between guide flanges 54,56 or the distance to the permanent flange 19 and the position of the paper path.

Outer sleeve 36 has a photographic print paper engaging surface 62. Photographic print paper engaging surface 62 lies between guide flanges 54,56 and preferably has a partial rubber covering 64, known as "tires," to engage the photographic print paper. Photographic print paper 14 engages the outer sleeve 36 with a photosensitive side. Tires 64 help prevent scratches from occurring on the photosensitive emulsion side of the photographic print paper 14 by holding print paper 14 off of surface 62. In addition, spindle 17 has a brake (from previous use as a supply paper spindle) and the outer sleeve's rotation prevents scratching of the photosensitive emulsion side of the print paper 14 engaging the outer sleeve 36.

In use, guide spool 16 of the present invention is attached to photographic printer 10 by engaging photographic print paper supply spindle 17 which was previously used to hold the internal photographic print supply roll (not shown). Spindle 17 has permanent flange 19 against which end 35 of inner sleeve 32 is placed. Thus with the rotatable outer sleeve 36 held in a fixed position on inner sleeve 32 by flange 34 and outer sleeve retainer ring 42, and with guide flanges 54 and 56 set at a predetermined distance from each other and a predetermined distance from end 35, the exact path for a particular width of photographic print paper is easily and quickly set by engaging the guide spool 16 with spindle 17 against permanent flange 19.

Guide spool 16 is most useful in the conversion of photographic printers from an internal print paper supply to an external print paper supply. In the conversion of such photographic printers, the external supply of photographic print paper must be precisely aligned with the print mask, a difficult task to accomplish. With the guide spool 16, the conversion and placement of external print paper supply 20 does not have to be as precise, since the guide spool 16 engages the print paper 14 and centers it with respect to print paper mask 12 by engaging spindle 17 and permanent flange 19.

In paper width changeovers, the centering of the print paper is quickly and precisely accomplished. The existing guide spool 16 is detached from spindle 17 and another appropriate guide spool 16 is placed against permanent flange 19 of photographic printer 10 and attached to spindle 17. The attachment of guide spool 16, automatically centers the guide flanges 54,56 which guide the print paper 14 with precise repeatability.

Guide spool 16 is also used in making fine adjustments in centering the photographic print paper 14 with respect to the print mask. The print paper 14 must be positioned within at least a tolerance of 0.015 inches of the correct print path to eliminate varying border problems. Offcentering of print paper occurs when a paper roll undersized in width is used. For example, 5 inch width paper may vary in width by 0.016 inches to 0.030 inches. To correct for undersized paper, guide flanges 54,56 are adjusted by loosening screws 58 and a fine adjustment is then made by turning the guide flanges 54,56 around threads 52. The threads 52 preferably allow for only slight adjustments, eliminating the possiblity of making large mistakes in adjustment. A large mistake in an adjustment would require a complete recentering of the guide flanges 54,56 with respect to print mask 12.

The guide spool system is preferably used for up to 5 inch wide print paper. If larger than 5 inch wide print paper is used, the guide spool is easily removed from spindle 17, as previously described, and the spindle 17 used as an internal print paper supply by attaching a paper roll to spindle 17. The printer 10 is then operated with an internal print paper supply, in the same manner previous to the addition of the external supply apparatus 20. Typically, print paper having a width between 5 and 10 inches is run from an internal supply position since most users buy, for example, 8 inch and 10 inch width print paper in 275 foot lengths because of cost and accidental wastage.

CONCLUSION

The guide spool of the present invention is a preset guiding device for a particular width of photographic print paper that may be quickly and easily detached. Another guide spool for a different width of photographic print paper is then attached with repeatable accuracy. Guide spool 16 provides precision paper guiding and allows for noncritical mounting of an external print paper supply.

Although the present invention has been described with reference to the preferred embodiment, persons skilled in the art will recognize that changes may be made in form and detail without departing from the spirit and scope of the invention.

What is claimed is:

1. For use with a photographic printer in which a photographic print paper web is transported from a print paper supply to a print mask location, an interchangeable guide spool for guiding the print paper to ensure proper centering at the print mask location, the guide spool being quickly attached or detached to accommodate a particular paper width by engaging a permanently positioned connective member of the photographic printer having a fixed spatial relationship with respect to the print mask, the guide spool comprising:

a stationary inner sleeve for attachably engaging with one end the permanently positioned connective member of the photographic printer;

a rotatable outer sleeve coaxially and rotatably mounted on the stationary inner sleeve and having an outer surface that engages the photographic print paper; and guide means attached to the outer surface of the outer sleeve for guiding the print paper;

means for attaching the guide means to the outer sleeve such that the guide means is positioned and set for a particular print paper width.

2. The invention of claim 1 wherein the guide means are a pair of guide flanges and wherein the means for attaching the guide means includes outer threads positioned on the outer surface of the outer sleeve proximate both ends and inner threads positioned on inner surfaces of the guide flanges such that the guide flanges threadably engage the outer threads of the outer sleeve, said guide flanges being positioned a predetermined distance from each other corresponding to a particular width of print paper.

3. The invention of claim 1 and further comprising bearing means for rotatably mounting the outer sleeve with respect to the inner sleeve.

4. The invention of claim 1 and further comprising: retainer ring means engaging the outer surface of the inner sleeve; and a retaining flange integral with the inner sleeve and protruding therefrom; the retainer ring means and retaining flange retaining the outer sleeve therebetween and at a preset distance from the one end of the inner sleeve which engages the permanently positioned connective member.

5. The invention of claim 1 wherein the outer sleeve has a rubber covering on its outer surface for engagement with the photographic print paper.

6. For use with a photographic printer in which a photographic print paper web is transported from a print paper supply to a print mask location, an interchangeable guide spool for guiding the print paper to ensure proper centering at the print mask location, the guide spool being quickly attached or detached to accommodate a particular paper width by engaging a positioning flange and a spindle of the photographic printer, the positioning flange having a fixed spatial relationship with respect to the print mask, the guide spool comprising:

an inner sleeve adapted to be fixedly mounted on the spindle of the photographic printer and having one end for engaging the positioning flange to positively position the guide spool;

a rotatable outer sleeve coaxially and rotatably mounted on the inner sleeve and having an outer surface that engages the photographic print paper; and guide means attached to the outer surface of the outer sleeve for guiding the print paper;

means for attaching the guide means to the outer sleeve such that the guide means is positioned and set for a particular print paper width.

7. The invention of claim 6 wherein the spindle includes an expandable core chuck and wherein the inner sleeve has an inner surface for engaging the expandable core chuck.

8. The invention of claim 6 wherein the guide means are a pair of guide flanges and wherein the means for attaching the guide means includes outer threads positioned on the outer surface of the outer sleeve proximate both ends and inner threads positioned on inner surfaces of the guide flanges such that the guide flanges threadably engage the outer threads of the outer sleeve, said guide flanges being positioned a predetermined distance from each other corresponding to a particular width of print paper.

9. The invention of claim 6 and further comprising bearing means for rotatably mounting the rotatable outer sleeve with respect to the inner sleeve.

10. The invention of claim 6 and further comprising: retainer ring means engaging the outer surface of the inner sleeve; and a retaining flange integral with the inner sleeve and protruding therefrom; the retainer ring means and retaining flange retaining the outer sleeve therebetween at a preset distance from the one end of the inner sleeve which engages the positioning flange.

11. The invention of claim 6 wherein the outer sleeve has a rubber covering on its outer surface for engagement with the photograhic print paper.

* * * * *